A. J. LECOUTRE.

CORSET STEEL.

APPLICATION FILED OCT. 23, 1919.

Reissued June 22, 1920.

14,892.

Inventor:
A. J. Lecoutre,
by Emery, Booth, Janney & Varney
Attys.

UNITED STATES PATENT OFFICE.

AUGUSTE J. LECOUTRE, OF WORCESTER, MASSACHUSETTS, ASSIGNOR TO ROYAL WORCESTER CORSET CO., OF WORCESTER, MASSACHUSETTS, A CORPORATION OF MASSACHUSETTS.

CORSET-STEEL.

14,892. Specification of Reissued Letters Patent. Reissued June 22, 1920.

Original No. 1,244,060, dated October 23, 1917, Serial No. 161,597, filed April 12, 1917. Application for reissue filed October 23, 1919. Serial No. 332,835.

*To all whom it may concern:*

Be it known that I, AUGUSTE J. LECOUTRE, a citizen of France, residing at Worcester, in the county of Worcester and State of Massachusetts, U. S. A., have invented certain new and useful Improvements in Corset-Steels, of which the following is a specification.

My invention relates to corset steels, and more particularly to the clasps or fastening devices which attach the two front corset steels together.

The object of my invention is to provide corset clasps of such construction that tilting of the plate steel stud members of the clasps will be largely prevented when the corsets are in use and under tension on the wearer, thus avoiding that annoying pinching of the flesh of the wearers, such as is likely to occur with the corset clasps at present in use. To this end the studs on the plate steel stud members of the clasps are formed with conical heads between which and the said steel stud members said studs are constructed with short straight or cylindrical necks or stems of a length, when the said stud members are covered with cloth, about equal to the thickness of the slotted eyes or eye members on the other plate steel members of the clasp.

Referring to the drawing:—

Figure 1:
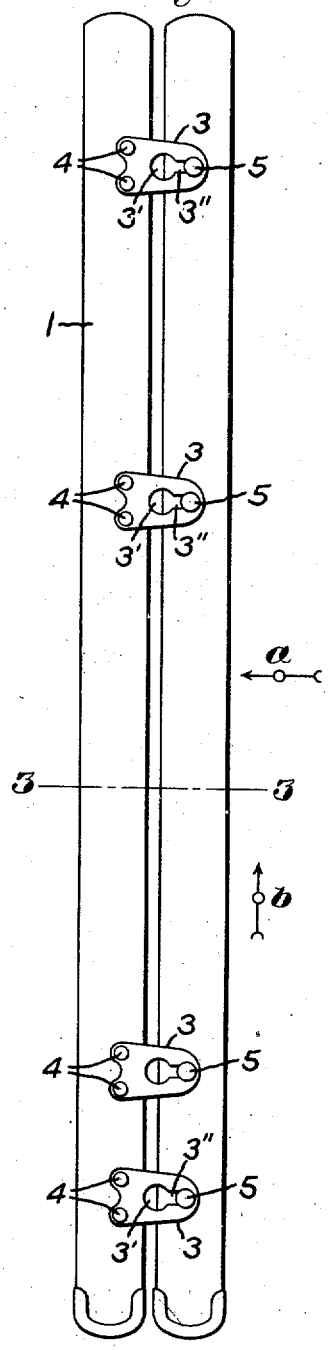
Figure 1 is a front view of the two steels, and the clasps or fastening devices, having studs of my improved construction.
Figure 2:
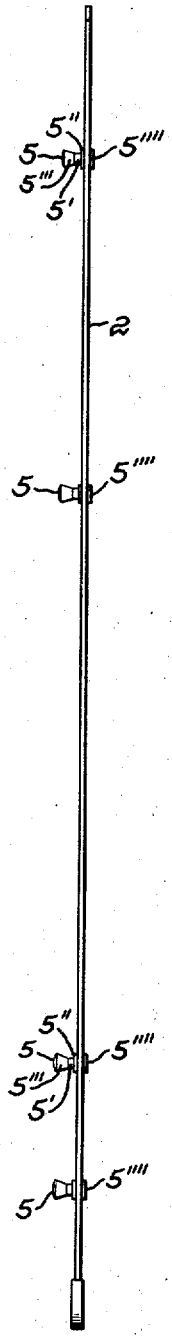
Fig. 2 is a side view of the steel shown at the right in Fig. 1, detached, looking in the direction of arrow *a*, same figure.
Figure 3:
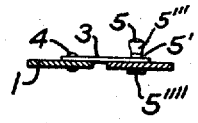
Fig. 3 is a section, on line 3, 3, Fig. 1, looking in the direction of arrow *b*, same figure.
Figure 4:
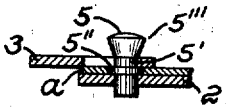
Fig. 4 shows, on an enlarged scale, one of the studs inserted through an opening in one of the steels, which is shown in cross section, before the stud is headed.
Figure 5:
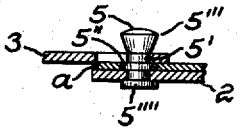

Fig. 5 corresponds to Fig. 4, but shows the lower end of the stud headed or spread, to secure the stud in the opening in the steel.

In the accompanying drawing, 1, and 2 are the two front steels of a corset; they may be of the usual form, and are preferably made of metal.

3 are the eye members of the fastening device, which are attached by rivets 4 to one of the steels, as 1. The eye members 3 have an opening 3′ therethrough, with the reduced sized opening 3″ leading out therefrom, in the usual way.

5 are the studs of my improved construction, forming, with the steel 2, the other member of the fastening devices. The studs 5 are of circular shape in cross section, and have short cylindrical necks or stems 5′. The heads 5‴ of the studs are made conical or tapering from near the upper ends thereof to the necks or stems 5′.

The cylindrical necks or stems 5′ of the studs 5 are of such length, as shown in the drawing, that when the plate steel stud member 2 is covered with fabric, *a*, the exposed portions of said necks or stems will be of a length about equal to the thickness of the slotted eye members 3. From this it results that the slotted eye members will fit closely on the straight or cylindrical necks or stems 5′, and close to the bases of the studs, being prevented from working up and down on the studs by the conical heads thereof, when the corset is under tension on the wearer. Thus the steel plate stud member 2 will be so steadily held in place by the coöperative action of the eye members 3 and the studs 5 that said stud member 2 cannot tilt in such a manner as to pinch the flesh of the wearer; while the conical heads of the studs will allow sufficient freedom between the eyes 3 and the studs 5 so that there will be no difficulty in unclasping the corsets. In clasping the corsets the conical heads of the studs will naturally force the eyes 3 down to their proper positions on the cylindrical necks 5′ of the studs, as the corsets are placed under tension on the wearer. This will bring the pull on the studs down close to the bases thereof, so as to avoid any tendency to tilt the plate steel stud member 2, as will be understood, and thus avoid danger of pinching the flesh of the wearer, as hereinbefore set forth.

The tapering head 5‴ of the stud preferably forms about two-fifths of the length of the stud, and the straight barrel or stem 5′ forms about three-fifths of the length of the stud, before it is secured in the opening in the steel.

After the barrel or stem 5″ of the stud is inserted in the opening in the steel it is headed or spread, as shown at 5'''', Fig. 5, to secure the stud to the steel and hold it in position.

Having thus described my invention, what I claim as new and desire to secure by Letters Patent is:

Claims.

1. In a corset fastening, the combination with an eye steel provided with slotted eye members, of a steel stud member provided with studs each having a conical head of substantial length tapering toward the base of the stud, and each having a straight or cylindrical neck, the latter of a length, when when said steel member is covered with cloth, approximately equal to the thickness of the eye members.

2. A fastener comprising, in combination, a socket member having a keyhole slot therethrough, the narrowed portion of the slot having substantially parallel sides, and a coöperating stud providing an inclined cam surface on that side thereof engaging the end of the narrowed portion of the slot, said cam surface inclined in a direction tending to cause the coöperating eye to be pressed against the base of the stud in use and the width of said narrow portion of the slot proportioned to prevent substantial tipping of the eye relative to the stud when under normal strain in use.

3. In a corset fastening, the combination of an eye steel provided with eye members having keyhole slots, of a stud steel having headed stud members provided with straight sided shanks of a length, when the steel is covered with fabric, substantially equal to the effective thickness of the engaging parts of the eye members, the members having coöperating parts effective on relative strain therebetween while the stud member remains in the narrower portion of the slot to develop a resultant force tending to return the eye members into engagement with the straight shank portion.

4. In a corset fastening, the combination of an eye steel provided with eye members having keyhole slots, of a stud steel having headed stud members provided with straight sided shanks of a length, when the steel is covered with fabric, substantially equal to the effective thicknesss of the engaging parts of the eye members, one of said members having a cam surface coöperating with a surface on the other and effective when the head member is in the narrow part of the slot and under the normal strain to draw the bases of the members together.

5. A fastener comprising, in combination, a socket member having a keyhole slot therein providing a narrowed portion and a coöperating stud having a head tapering toward the base thereof and of such width only adjacent the base thereof as to permit entrance of said head into the narrowed portion of the keyhole slot, the tapering portion of said head acting as a cam when bearing against the marginal portions of the narrowed part of the keyhole slot to draw the base of the stud toward the socket member when strain is exerted in such a direction as to draw the stud into the narrowed portion of the keyhole slot, the width of the keyhole slot being proportioned to prevent substantial tipping of the socket member relative to the stud when normal strain is exerted therebetween in use.

6. A fastener for corsets and the like comprising, in combination, a stud and an eye member providing a keyhole slot, cam means on the stud for drawing the stud base toward the eye member as the stud enters the narrower portion of the keyhole slot, said stud and slot proportioned to preclude substantial relative tipping of stud and eye member when the stud is entered in the narrower portion of the keyhole slot and under normal strain in use.

In testimony whereof, I have signed my name to this specification.

AUGUSTE J. LECOUTRE.